US005309313A

United States Patent [19]

Yaworski et al.

[11] Patent Number: 5,309,313
[45] Date of Patent: May 3, 1994

[54] FAULT GAS SEAL FOR A POLYMER SURGE ARRESTER

[75] Inventors: Harry G. Yaworski, Easton, Pa.; Larry N. Siebins, Port Murray, N.J.

[73] Assignee: Amerace Corporation, Hackettstown, N.J.

[21] Appl. No.: 831,682

[22] Filed: Feb. 5, 1992

[51] Int. Cl.[5] .............................................. H02H 9/04

[52] U.S. Cl. .................................... 361/127; 361/117; 361/132

[58] Field of Search .................. 361/117, 127, 132, 91

[56] References Cited

U.S. PATENT DOCUMENTS 3,702,419 11/1972 Carothers et al. .................. 361/127

*Primary Examiner*—A. D. Pellinen
*Assistant Examiner*—S. Jackson
*Attorney, Agent, or Firm*—David Teschner

[57] ABSTRACT

Fault gas seals to prevent the ejection of a surge arrester from a loadbreak bushing due to the generation of such gas in response to the failure of arrester devices in such surge arrester. A metal O-ring support is bonded to the conductive insert of the arrester housing or added as a retrofit to such housing. Annular grooves in the loadbreak probe are fitted with O-rings which are compressed against the support to provide a gas-tight passage along the probe surface. An additional annular groove can be used to receive a fastener to hold the retrofit in position.

10 Claims, 6 Drawing Sheets

FAULT GAS SEAL FOR A POLYMER SURGE ARRESTER

CO-PENDING APPLICATIONS

U.S. patent application No. 07/483,656 filed Feb. 23, 1990 for Surge Arrester With Rigid Insulation Housing by Harry G. Yaworski and Larry N. Siebins.

U.S. patent application No. 07/658,211 filed Feb. 20, 1991 for Directionally Vented Underground Distribution Surge Arrester by Harry G. Yaworski and Alan D. Borgstrom.

Both applications assigned to the Assignee of the instant application.

BACKGROUND OF THE INVENTION

1. Field of the Invention

The invention is directed to the field of surge arresters to protect high-voltage systems from the effects of over-voltage incidents created by lightening strikes and, more particularly, to the construction of such surge arresters to prevent injury to personnel or equipment due to the generation of fault gases caused by the failure of such surge arresters during over-voltage incidents.

2. Description of the Prior Art

A surge arrester constructed in accordance with the prior art and more particularly one constructed according to one of the embodiments of the device of co-pending U.S. patent application No. 07/658,211 filed Feb. 20, 1991 is shown on the righthand portion of FIG. 1 hereof. (Also see FIGS. 2, 3 and 4) Surge arrester 100 has an elbow-shaped body 102 having a horizontal leg 104 which contains a receptacle 110 to receive a loadbreak bushing insert 148. Loadbreak probe 112 will enter the female contacts (not shown) of insert 148 and insert 148 will be locked in place in receptacle 110 when the annular recess 150 engages detent rib 114 within receptacle 110. Probe 112 engages metal coupling 122 by means of an externally threaded portion (not shown) which engages an internally threaded aperture (not shown) as is well known in the art.

A series of zinc oxide arrester blocks 116 are positioned in the bore of verticle leg 106, and are connected by compression spring 118 and shunt 120 to metal coupling 122. A layer of semi-conductive elastomer 130 such as EPDM rubber containing carbon black is formed about the end of probe 112 and the metal coupling 122. It is desired that the interface between the layer 130 and the probe 112 and metal coupling 122 be as tight as possible so that no gas can pass along such interface.

The blocks 116 are held in place by end cap 128, compression spring 124 and shunt 126. During over-voltage incidents it is possible for one or more of the blocks 116 to fail (represented by the star burst 160 in the center block 116 (see FIG. 2)) and produce large quantities of fault gases (represented by the arrows 162, 164 of FIG. 3.) These gases are intended to propel the blocks 116 downwardly as shown by the arrows 166 (see FIG. 4) after the cap 128 has been forced from verticle leg 106 and thus control the direction of any materials ejected from the failed surge arrester 100 to one which will create the least amount of danger to any person or equipment around the failed surge arrester.

To further seek to insure that the release of fault gases and any other materials ejected is downward and does not occur through the sides of the arrester and to constrain the expansion and possible fracture of the arrester housing, an expansion tube 140 is added to the outside of the housing adjacent verticle leg 106. The expansion tube 140 can be supported by external fins 142 as shown or by a strap over the top of the horizontal leg 104. The expansion tube 140 permits the verticle leg 106 to expand within its elastic limit (see FIG. 3) and allow the gases to be vented downwardly along the outside of blocks 116 (see FIG. 4). The expansion tube 140 also acts to contain any block fragments or other debris which could pierce verticle leg 106 and fly outwardly from surge arrester 100.

However, if the fault gases generated in response to block 116 failure are not fully contained in verticle leg 106, the verticle leg 106 may not expand properly to vent the fault gases to the outside of surge arrester 100 and instead the fault gases may move along the interface of semi-conductor layer 130 into receptacle 110 and force the surge arrester 100 from the loadbreak bushing insert 148 and into persons or equipment in proximity to such insert and leaving the circuit to be protected open.

SUMMARY OF THE INVENTION

The instant invention seeks to overcome the difficulties noted above with respect to prior art devices by providing a fault gas seal for a polymer surge arrester to prevent fault gases generated in one leg of an elbow-shaped surge arrester from affecting the functions carried out in the other leg of such elbow-shaped surge arrester. More particularly, to prevent fault gases from dislodging the elbow arrester from its position on a loadbreak bushing insert.

Two versions of the invention are disclosed, a first which can be formed as part of the structure of the surge arrester when originally constructed and a second form which can be retrofit in the field to existing elbow-shaped surge arresters.

The usual loadbreak probe 112 is replaced with one having two annular rings or recesses cut into its exterior surface in the region of the probe near where it joins the metal coupling 122 of the arrester blocks 116 and adjacent the semi-conductive layer 130. A brass O-ring support is bonded to the semi-conductive layer 130 and serves to support and compress the two O-rings placed in the probe recesses when the probe is joined to metal coupling 122. These compressed O-rings will seal the region about the probe and prevent the leakage of fault gases into the receptacle 110.

In the retrofit version, the probe is further modified by adding a third annular ring or recess in the exterior surface thereof to receive a retaining ring. The retrofit O-ring support is inserted into the bore which receives the probe as well. When the probe is inserted, the O-rings are compressed by the probe and O-ring support and when the retaining ring is positioned on the probe, the ends of the O-ring support further engage the semi-conductive layer 130 to provide a further fault gas seal between the support and the semi-conductive layer 130. It is therefore an object of this invention to provide an improved surge arrester construction.

It is another object of this invention to provide an improved surge arrester construction which controls the venting of any fault gases produced by a failure of the surge arrester.

It is still another object of this invention to provide a series of internal fault gas seals to prevent fault gases generated in one position of an elbow-shaped arrester from interfering with the operation of other portions of the arrester.

It is yet another object of this invention to provide a series of internal fault gas seals to prevent fault gases generated in the arrester from dislodging it from a device to which it is connected.

It is another object of this invention to provide a series of internal fault gas seals which can be formed as a part of an elbow-shaped surge arrester when originally constructed.

It is still another object of this invention to provide a series of fault gas seals which can be retrofit to existing elbow-shaped surge arresters.

Other objects and features of the invention will be pointed out in the following description and claims and illustrated in the accompanying drawings, which disclose, by way of example, the principles of the invention, and the best modes which have been presently contemplated for carrying them out.

BRIEF DESCRIPTION OF THE DRAWING

In the drawings in which similar elements are given similar reference characters.

DESCRIPTION OF THE PREFERRED EMBODIMENT

Figure 1:
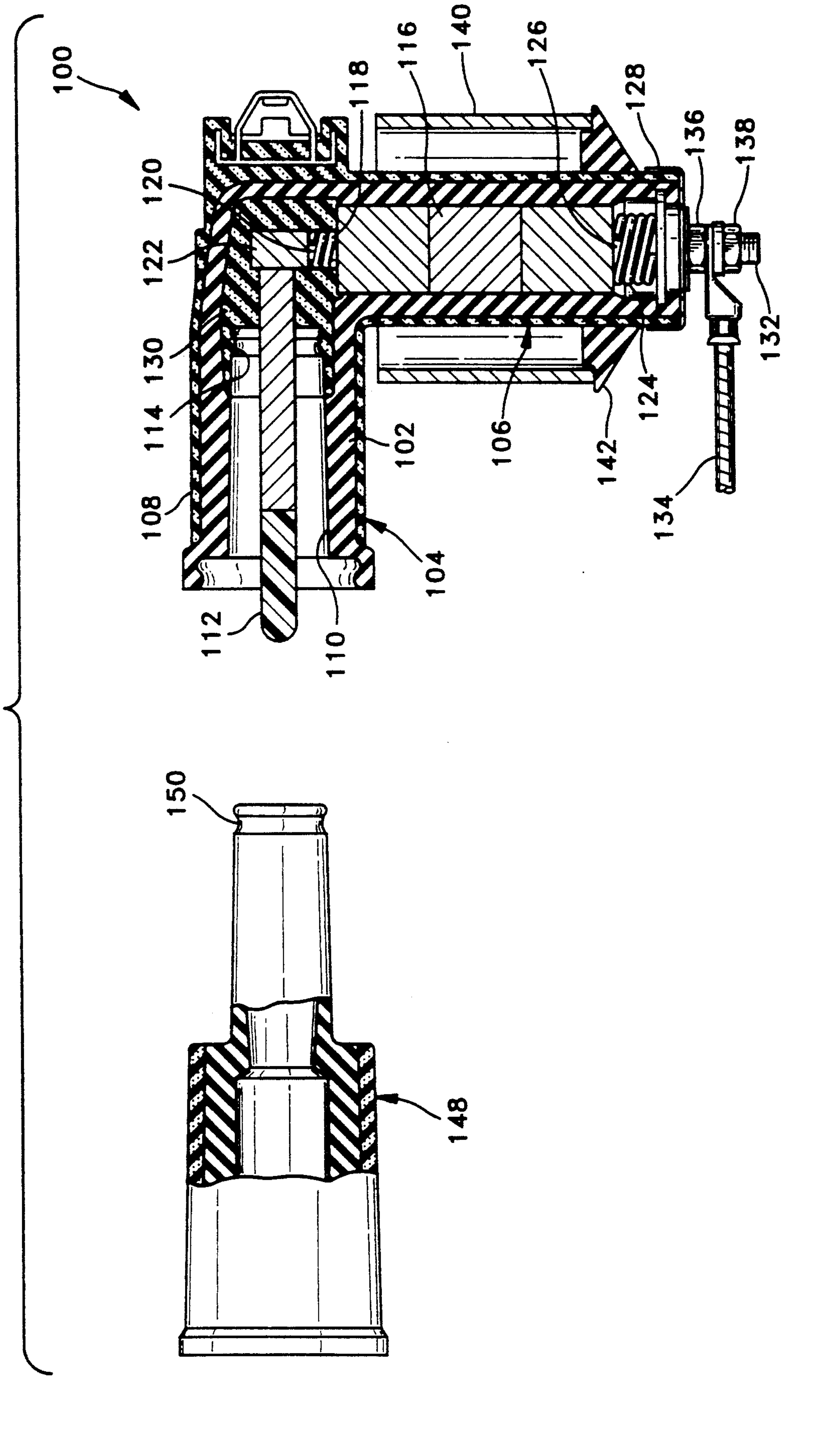
FIG—1 PRIOR ART
FIG. 1 is a side elevational view, partly in section, of an elbow-shaped surge arrester on the righthand portion, which arrester is according to FIG. 2 of the above-identified co-pending U.S. patent application No. 07/658,211 and further slowing a typical loadbreak bushing insert to which the arrester is assembled.
Figure 2:
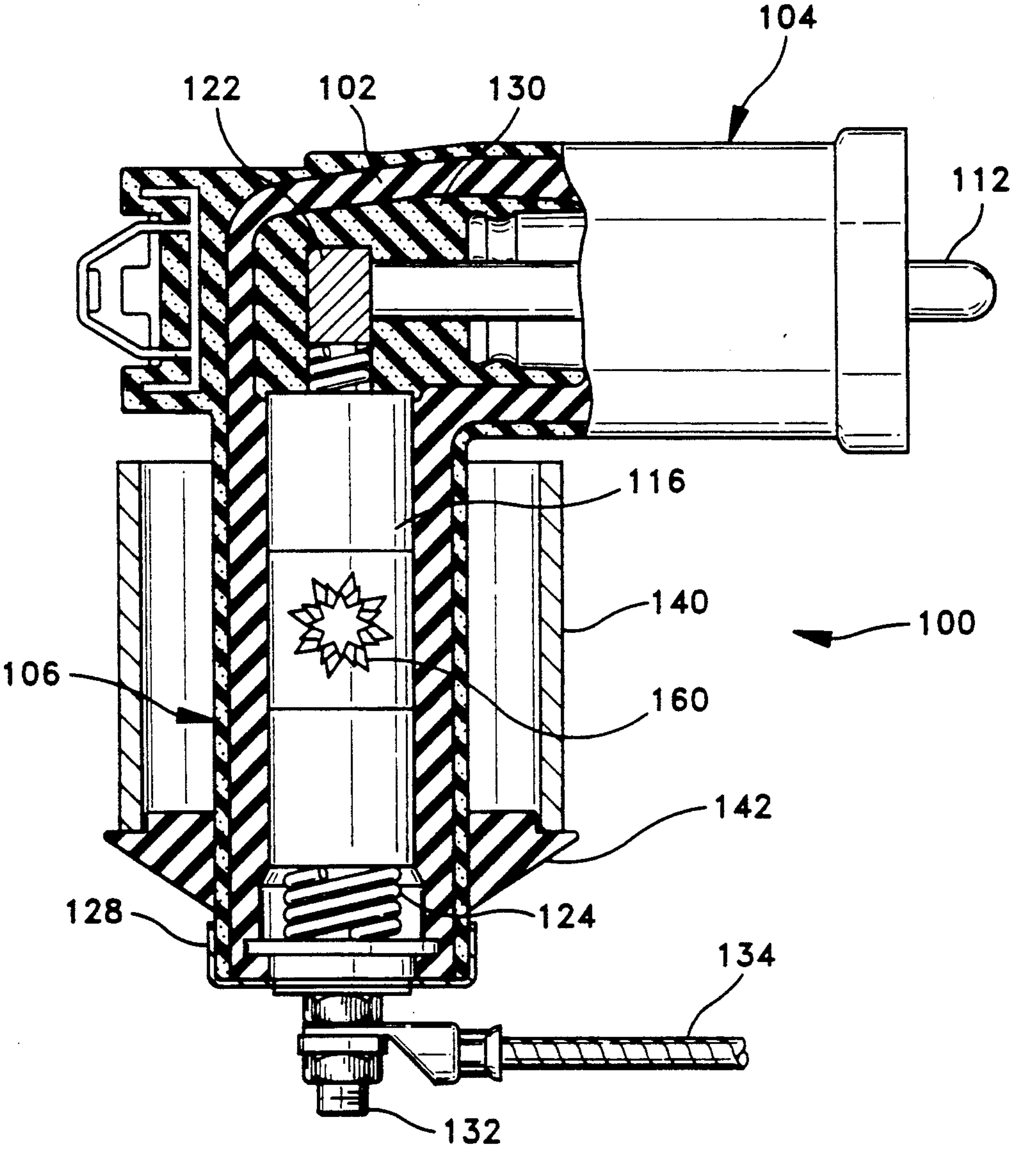
FIG-2 PRIOR ART
FIGS. 2 to 4 are idealized drawings of the operation of the elbow-shaped surge arrester of FIG. 1 under fault gas conditions.
Figure 3:
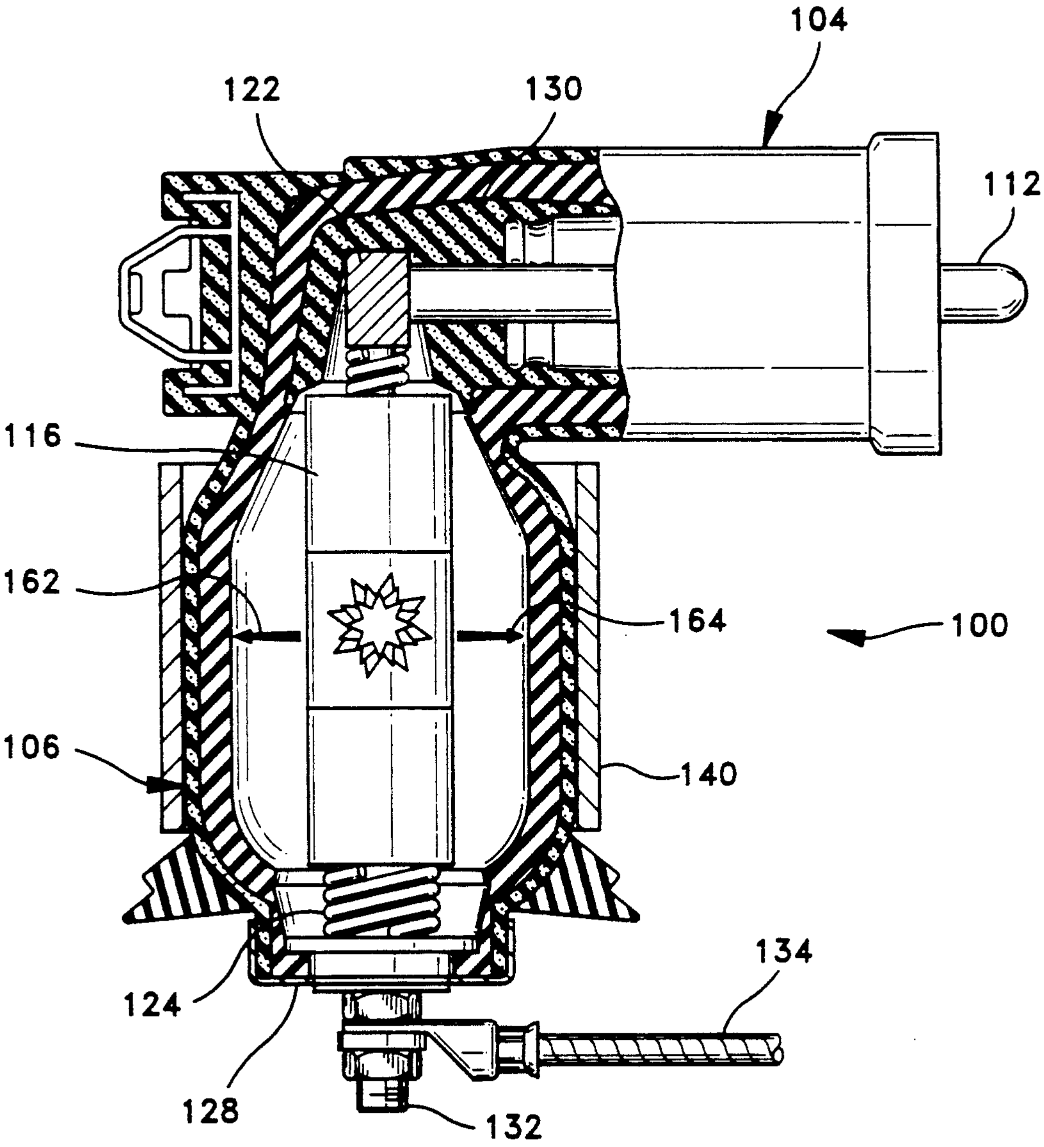
FIG-3 PRIOR ART
Figure 4:
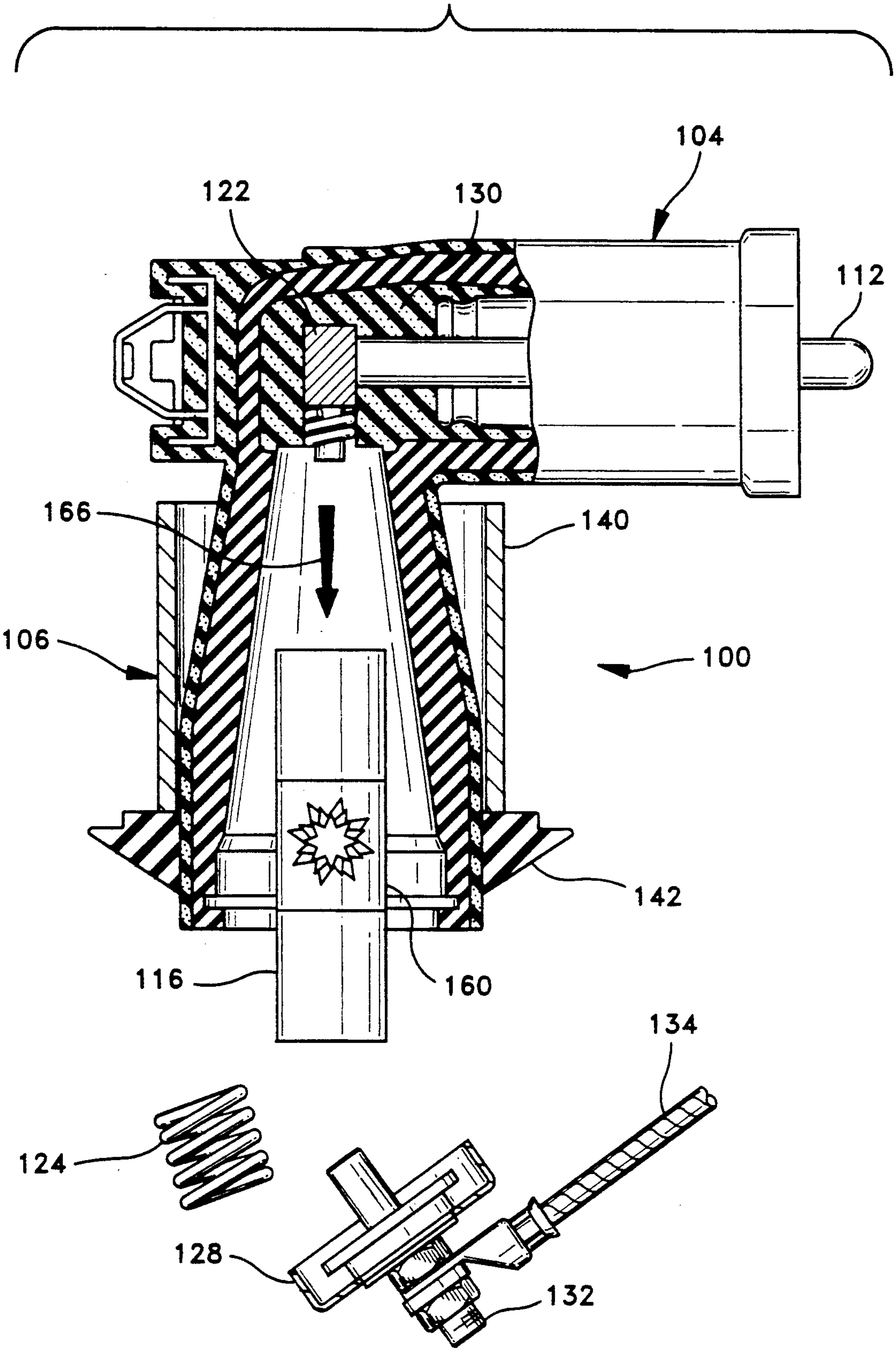
FIG-4 PRIOR ART

As was described above with reference to FIGS. 3 and 4, in the desired failure mode, once a block 116 fails and begins to generate fault gases, it is desired that verticle leg 106 expand outwardly under the influence of the gases shown by arrows 162, 164 towards the limit established by expansion tube 140. During this expansion of verticle leg 106 and because of fault gases acting on it as well, cap 128 is dislodged and the blocks 116 are surged downwardly by the fault gas above it as illustrated by arrows 166.

However, because probe 112 is screwed into metal coupling 122 to complete the assembly of the elbow-shaped arrester 100 after the block assembly is added to verticle leg 106 as is well known in the art, it is not possible to bond semi-conductive layer 130 to the outer surface of the probe 112 and some clearance exists between the outer surface of probe 112 and the inner surface of semi-conductive layer 130. Also the expansion of the semi-conductive layer 130 in the region of the metal coupling 122, spring 118 and shunt 120 due to the presence of fault gases provides a passage for the fault gases around metal coupling 122 between it and the semi-conductive layer 130. If sufficient amounts of gas are able to bypass the metal coupling 122 and probe 112, sufficient pressure is built up in receptacle 110 to cause the arrester 100 to separate from the loadbreak bushing insert 148 and be propelled against nearby personnel and equipment with possible injury to such personnel or damage to the equipment. Also the protection afforded to the cable or transformer connected to the other side of insert 148 is removed with possible consequences as well.

Figure 5:
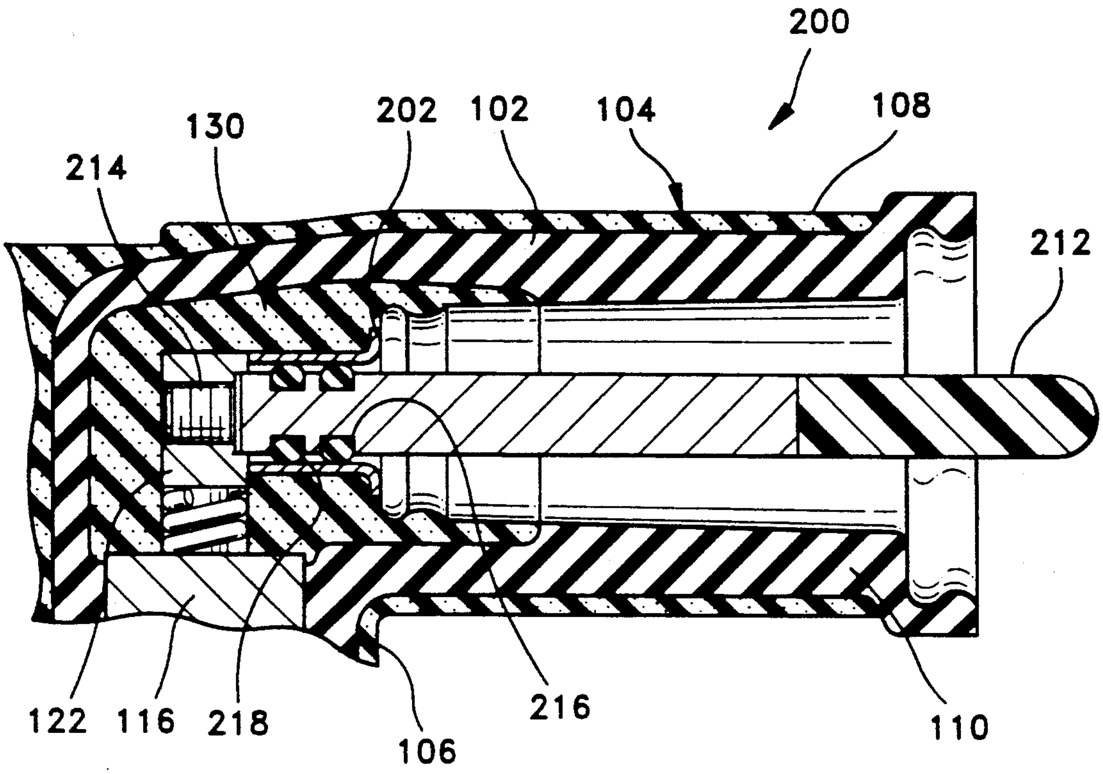
FIG. 5 is a fragmentary, side-elevational view, partly in section, of a portion of the surge arrester of FIG. 1 modified according to a first embodiment of the invention.
Figure 6:
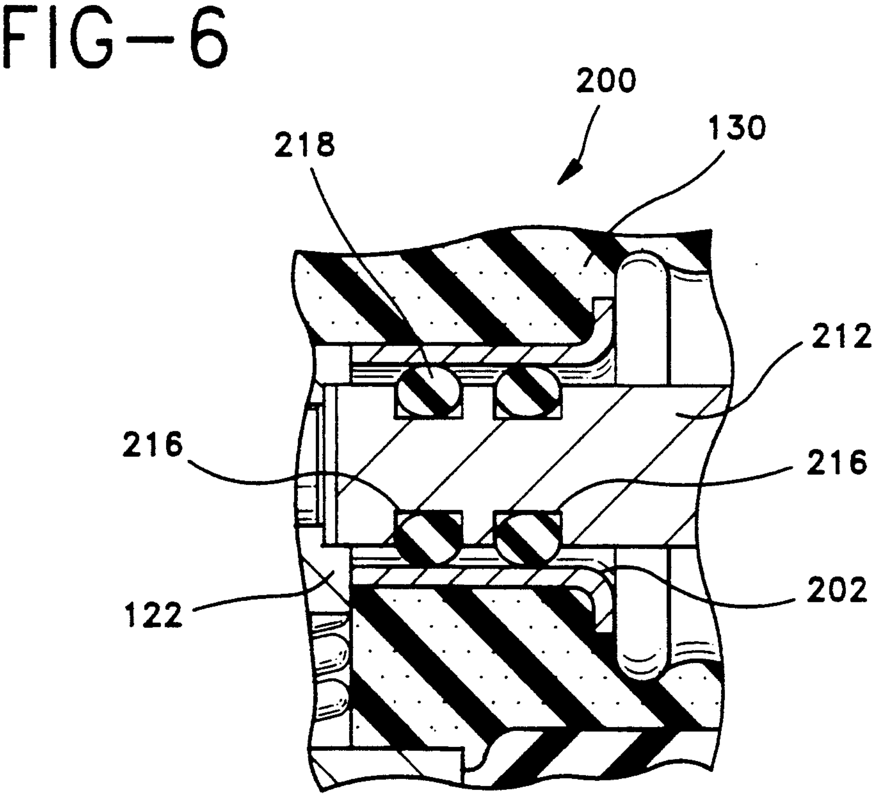
FIG. 6 is an enlargement of a portion of FIG. 5 to better illustrate one embodiment of the instant invention.

Turning now to FIGS. 5 and 6, a first embodiment of a fault gas seal according to the concepts of the invention is shown. A brass O-ring support 202 is added to elbow-shaped surge arrester 200. The support 202 is in the form of a closed cylinder with its end adjacent the receptacle 110 flaired outwardly. The support 202 will be placed in the mold in which the semi-conductive layer 130 is to be formed and coated with a suitable bonding agent. Thus, when the semi-conductive layer 130 is molded, the support 202 will be bonded to the semi-conductive layer 130 and form a portion of the outer surface of such semi-conductive layer 130.

The usual loadbreak probe 112 is removed and replaced with loadbreak probe 212 which has the same general configuration and size as probe 112. Adjacent the threaded end 214 of probe 212, where it is threadably coupled to metal coupling 122, are placed two annular recesses 216. In each of the recesses 216 is placed an O-ring seal 218. The O-ring seals 218 are placed in the recesses 216 prior to the installation of probe 212 in arrester 200. As the probe 212 is assembled to metal coupling 122 by twisting it to cause threaded end 214 to engage the threaded aperture of metal coupling 122, the O-ring seals 218 are partially compressed by the O-ring support 202 and form a gas tight joint between probe 212 and O-ring support 202 preventing the passage of fault gases from vertical leg 106 into receptacle 110.

Figure 7:
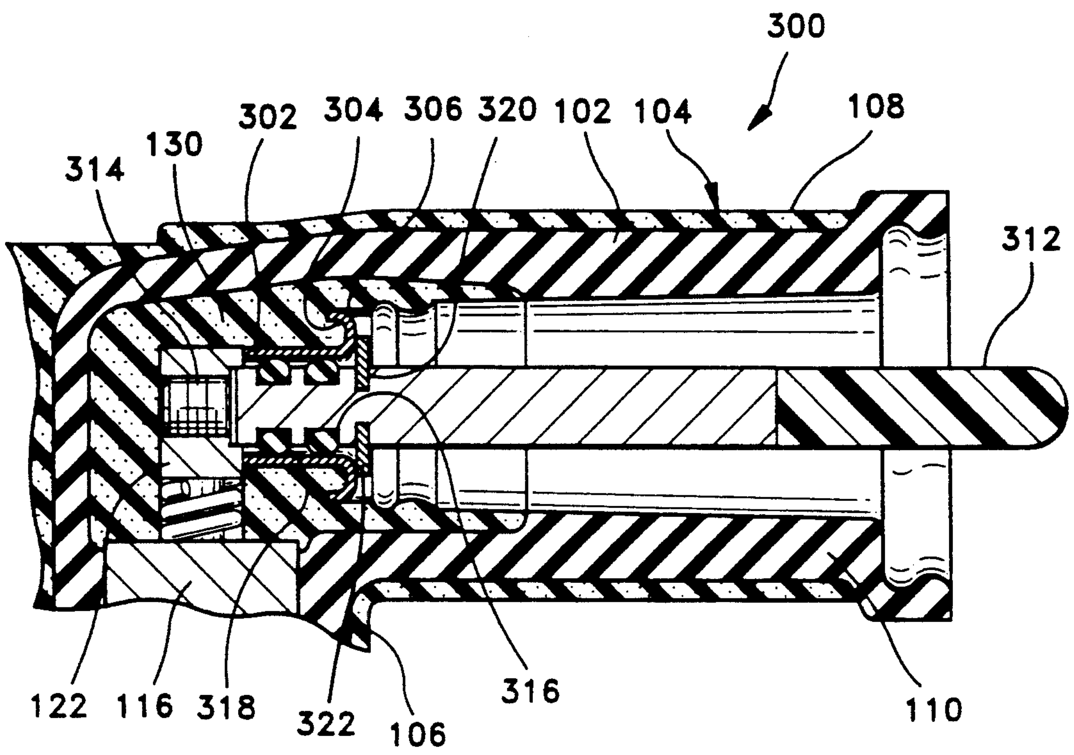
FIG. 7 is a fragmentary, side-elevational view, partly in section of a portion of the surge arrester of FIG. 1 modified according to a second embodiment of the invention.
Figure 8:
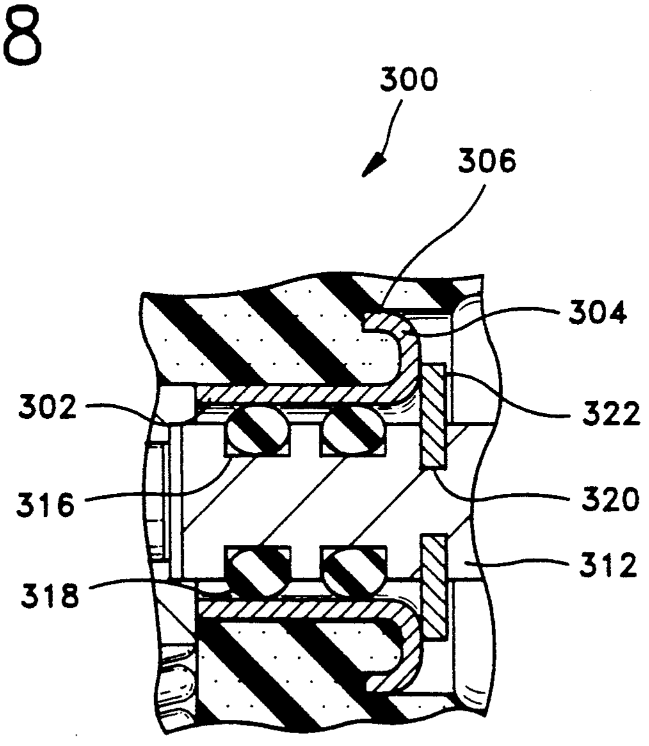
FIG. 8 is an enlargement of a portion of FIG. 7 to better illustrate the second embodiment of the instant invention.

The embodiment of FIGS. 7 and 8 show a retrofit arrangement wherein a brass O-ring support 302 is added to the bore of an existing elbow-shaped surge arrester 300. Support 302 is generally cylindrical with the end adjacent receptacle 110 outwardly flaired as at 304 and with the end turned inwardly as at 306. Probe 312 has two annular recesses 316 into which are placed O-ring seals 318. The O-ring seals will again be placed in recesses 316 before assembly of probe 312 to metal coupling 122 and will be compressed between probe 312 and support 302 when probe 312 is assembled by its screw threaded end 314 to the threaded aperture of metal coupling 122.

In addition to the two annular recesses 316, there is a further annular recess 320 to receive a retaining ring 322. Retaining ring 322 will bear upon portion 304 of support 302 as probe 312 is assembled to metal coupling 122 to force inturned end 306 into intimate contact with the edge of semi-conductive layer 130 to form a further seal. Thus, the O-ring seals 318 compressed between probe 312 and the support 302 will prevent the movement of fault gases along the surface of probe 312 and the seal between end 306 of support 302 and semi-conductive layer 130 will prevent the movement of fault gases between support 302 and the semi-conductive layer 130.

While two sets of O-rings 218 and 318 have been shown, it should be appreciated that a single O-ring seal could be employed or more than two O-ring seals used depending upon the volume and pressure of the gas generated and the desire for redundant seals.

With the arrangements of FIGS. 5 to 8, the amount of fault gases permitted to reach receptacle 110 is held to a minimum and thus not able to cause the ejection of elbow-shaped surge arresters 200 and 300 from their respective loadbreak bushing inserts 148. The volume of fault gases is contained within the verticle leg 106 and is sufficient to operate the ejection mode desired for the minimization of injury to persons or damage to nearby equipment.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows;

What is claimed is:

1. In an elbow-shaped surge arrestor having a dielectric housing, a first leg having a first passage within which are located one or more arrestor devices coupled to a first connector and a second leg having a receptacle to receive the end of a loadbreak bushing insert and a second passage to receive a loadbreak probe connected to said first connector, the improvement comprising at least one annular groove about said loadbreak probe adjacent its end connected to said first connector and seal means in said second passage, one for each of said annular grooves and positioned in its associated groove, said seal means to prevent the entry of gases generated by the failure of one or more of said arrestor devices in said first passage into said receptacle to force said elbow-shaped surge arrestor to separate from a loadbreak bushing insert upon which said elbow-shaped surge arrestor is installed.

2. In an improved elbow-shaped surge arrestor as claimed in claim 1, wherein said seal means comprises at least one O-ring.

3. In an improved elbow-shaped surge arrestor as claimed in claim 1, wherein said seal means comprises two O-rings.

4. In an improved elbow-shaped surge arrestor as claimed in claim 1, comprising retaining means and at least one O-ring.

5. In an improved elbow-shaped surge arrestor as claimed in claim 4, wherein said retaining means is conductive.

6. In an improved elbow-shaped surge arrestor as claimed in claim 4, wherein said retaining means is formed as a portion of the wall defining said second passage.

7. In an improved elbow-shaped surge arrestor as claimed in claim 4, wherein said retaining means is inserted inside of and becomes a part of the wall defining said second passage.

8. In an improved elbow-shaped surge arrestor as claimed in claim 6, wherein said retaining means is bonded to and becomes a portion of the wall defining said second passage.

9. In an improved elbow-shaped surge arrestor as claimed in claim 7, wherein said loadbreak probe has an additional recess in its outer surface to receive a fastener to hold said retaining means in said second passage wherein said probe is connected to said first connector.

10. In an improved elbow-shaped surge arrestor as claimed in claim 7, wherein said retaining means has a generally cylindrical-shaped body with one end thereof flared outwardly and the free end thereof bend back in a plane parallel with the main cylindrical-shaped body; said free end being forced to engage the material defining said wall to form a further seal.

* * * * *